US012762640B2

(12) United States Patent
Chen et al.

(10) Patent No.: US 12,762,640 B2
(45) Date of Patent: Oct. 13, 2026

(54) METHOD AND DEVICE OF DYNAMICALLY ADJUSTING RESOLUTION

(71) Applicant: Wistron Corp., New Taipei City (TW)

(72) Inventors: Jia Sheng Chen, New Taipei City (TW); Zheng Ying Gao, New Taipei City (TW); Yong Qiang Li, New Taipei City (TW); Jun Xin Qiu, New Taipei City (TW)

(73) Assignee: WISTRON CORP., New Taipei City (TW)

( * ) Notice: Subject to any disclaimer, the term of this patent is extended or adjusted under 35 U.S.C. 154(b) by 146 days.

(21) Appl. No.: 18/641,900

(22) Filed: Apr. 22, 2024

(65) Prior Publication Data

US 2025/0245776 A1 Jul. 31, 2025

(30) Foreign Application Priority Data

Jan. 31, 2024 (CN) ......................... 202410141724.1

(51) Int. Cl.
*G06T 3/40* (2024.01)
*G06T 1/20* (2006.01)
(Continued)

(52) U.S. Cl.
CPC .................. *G06T 1/20* (2013.01); *G06T 1/60* (2013.01); *G06T 3/40* (2013.01); *G09G 3/20* (2013.01);
(Continued)

(58) Field of Classification Search
CPC ........................................................ G06T 3/40
See application file for complete search history.

(56) References Cited

U.S. PATENT DOCUMENTS

| | | | | |
|---|---|---|---|---|
| 5,721,565 | A | 2/1998 | Nguyen | |
| 2017/0229093 | A1* | 8/2017 | Sivertsen | G06F 3/14 |
| 2018/0108114 | A1* | 4/2018 | Boshra-Riad | G09G 5/363 |

FOREIGN PATENT DOCUMENTS

| | | | |
|---|---|---|---|
| CN | 108322672 | A | 7/2018 |
| JP | H11298892 | A | 10/1999 |

OTHER PUBLICATIONS

Chinese language office action dated Sep. 3, 2024, issued in application No. TW 113112509.

(Continued)

*Primary Examiner* — Matthew Salvucci
(74) *Attorney, Agent, or Firm* — McClure, Qualey & Rodack, LLP

(57) ABSTRACT

A method for dynamically adjusting resolution is provided. The method includes performing a ratio reduction operation on a native resolution of a display screen of the display device according to a ratio data command to obtain a target resolution when receiving the ratio data command. The method includes replacing the native resolution at a resolution storage address in an extended display identification data (EDID) with the target resolution to allow the target resolution to be read by a source device. The method includes receiving image data, wherein the image data is generated by the source device according to the target resolution. The method includes performing a ratio increase operation on the target resolution according to the ratio data command to obtain a screen resolution. The method includes setting the native resolution of the display screen to the screen resolution to display the image data.

14 Claims, 7 Drawing Sheets

(51) Int. Cl.
*G06T 1/60* (2006.01)
*G09G 3/20* (2006.01)

(52) U.S. Cl.
CPC ................. *G09G 2330/021* (2013.01); *G09G 2340/0407* (2013.01)

(56) References Cited

OTHER PUBLICATIONS

Chinese language office action dated May 25, 2026, issued in application No. CN 202410141724.1.

* cited by examiner

METHOD AND DEVICE OF DYNAMICALLY ADJUSTING RESOLUTION

CROSS REFERENCE TO RELATED APPLICATIONS

This application claims priority from China Patent Application No. 202410141724.1, filed on Jan. 31, 2024, the disclosure of which is incorporated herein in its entirety by reference.

BACKGROUND OF THE APPLICATION

Field of the Application

The present disclosure generally relates to the field of display technologies. More specifically, aspects of the present disclosure relate to a method and device for dynamically adjusting resolution.

Description of the Related Art

Display technology is maturing and becoming more affordable to the consumer, and as a result, demand for high-end display devices has increased significantly. At present, high-quality content such as Dolby ultra-high definition (UHD) movies and UHD games are popular, and the resolution of display devices has been greatly improved. UHD display devices will have broad market space in the future.

However, UHD display devices still have the following shortcomings. (1) UHD display devices can easily cause a waste of computing power resources, power consumption resources, and transmission resources. Not all usage scenarios and applications require UHD display devices to produce UHD image quality. For example, in an office environment where text and codes make up the majority of what is displayed, there is no advantage to using UHD image quality. Since a computer graphics card outputs signals at the highest resolution and the highest refresh rate over a long period of time, the rendering computing power of these graphics cards is under high load, which will cause unnecessary waste of power consumption. (2) Due to its high resolution, the desktop display ratio is seriously unbalanced, affecting daily office efficiency. In order to achieve UHD image quality, the display device requires more pixels, which will inevitably lead to problems such as reduced pixel spacing, smaller display content, and excessively small proportions of text, icons, and images. These problems affect user experience and affect daily office use. (3) The display resolution of multiple display devices using the multi stream transport (MST) function is limited. The multi-stream transmission function needs to meet the resolution of the first main display device before the margin can be allocated to the second and third display devices, so that the first display device can display better quality images, and the second and third display devices can only display images of rough quality, which results in a poor user experience for users using the MST function.

As for the problem that the display ratio of UHD monitors is too small, scaling is currently performed through the scaling function of the operating system and using software. However, this scaling feature is not compatible with all software and applications. Furthermore, since the operating system that changes the resolution only scales the display results of the display device, the actual bandwidth of the image transmission is not reduced. When the power consumption and computing power of the operating system remain at the highest level, it will cause a serious waste of resources.

Therefore, there is a need for a method and device for dynamically adjusting resolution to achieve the purpose of reducing the power consumption of the operating system and the display device, maintaining better image quality, and improving screen viewing comfort.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, a method and device for dynamically adjusting resolution provided in the present disclosure resets the communication channel between the source device (such as a host device with a computer graphics card) and the display device through instructions to dynamically adjust the resolution of the display device, so that it can be achieved the purpose of reducing communication data and bandwidth, reducing the amount of data generated by the source device, and reducing the overall display system power consumption while maintaining good image quality.

In an exemplary embodiment, a method for dynamically adjusting resolution is provided. The method is implemented by a display device. The method includes performing, by a microcontroller of the display device, a ratio reduction operation on a native resolution of a display screen of the display device according to a ratio data command to obtain a target resolution when receiving the ratio data command. The method includes replacing, by the microcontroller, the native resolution at a resolution storage address in an extended display identification data (EDID) with the target resolution to allow the target resolution to be read by a source device. The method receiving, by the microcontroller, image data, wherein the image data is generated by the source device according to the target resolution. The method includes performing, by the microcontroller, a ratio increase operation on the target resolution according to the ratio data command to obtain a screen resolution. The method includes setting, by the microcontroller, the native resolution of the display screen to the screen resolution to display the image data.

In some embodiments, the ratio data command includes a value used to indicate a scaling ratio. The ratio reduction operation further comprises dividing the native resolution by the value and performing a round-down operation to generate a first resolution. The ratio reduction operation comprises setting the first resolution to the target resolution when the first resolution is not greater than the native resolution. The ratio reduction operation comprises setting the native resolution to the target resolution when the first resolution is greater than the native resolution.

In some embodiments, the value is a positive number.

In some embodiments, the ratio data command comprises a value used to indicate the scaling ratio. The ratio increase operation further comprises performing a round-down operation on the value to generate a first value and multiplying the target resolution by the first value to generate the screen resolution.

In some embodiments, a display command is sent to the display screen when the screen resolution is lower than the native resolution, wherein the display command is used to instruct the display screen to display the image data in the center of the display screen and turn off driving power corresponding to edge area exceeding the screen resolution or display colors with low power consumption in the edge area.

In some embodiments, the method comprises storing the native resolution in another storage location in the EDID. The method comprises replacing the target resolution in the resolution storage address with the native resolution when the source device cannot read the target resolution.

In some embodiments, the image data has the target resolution.

In some embodiments, after the native resolution is replaced with the target resolution, transmission channels between the source device and the display device are reset by the microcontroller.

In an exemplary embodiment, a device for dynamically adjusting resolution is provided. The device comprises one or more processors and one or more computer storage media for storing one or more computer-readable instructions. The processor is configured to drive the computer storage media to execute the following tasks. The following tasks comprise performing a ratio reduction operation on a native resolution of a display screen according to a ratio data command to obtain a target resolution when receiving the ratio data command. The following tasks comprise replacing the native resolution at a resolution storage address in an extended display identification data (EDID) with the target resolution to allow the target resolution to be read by a source device. The following tasks comprise receiving image data, wherein the image data is generated by the source device according to the target resolution. The following tasks comprise performing a ratio increase operation on the target resolution according to the ratio data command to obtain a screen resolution. The following tasks comprise setting the native resolution of the display screen to the screen resolution to display the image data.

BRIEF DESCRIPTION OF DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The embodiments of the present disclosure provide a method and device for dynamically adjusting resolution, which reset the communication channel between the source device (such as a host device with a computer graphics card) and the display device through instructions to dynamically adjust the resolution of the display device, so that it can be achieved the purpose of reducing communication data and bandwidth, reducing the amount of data generated by the source device, and reducing the overall display system power consumption while maintaining good image quality.

Figure 1:
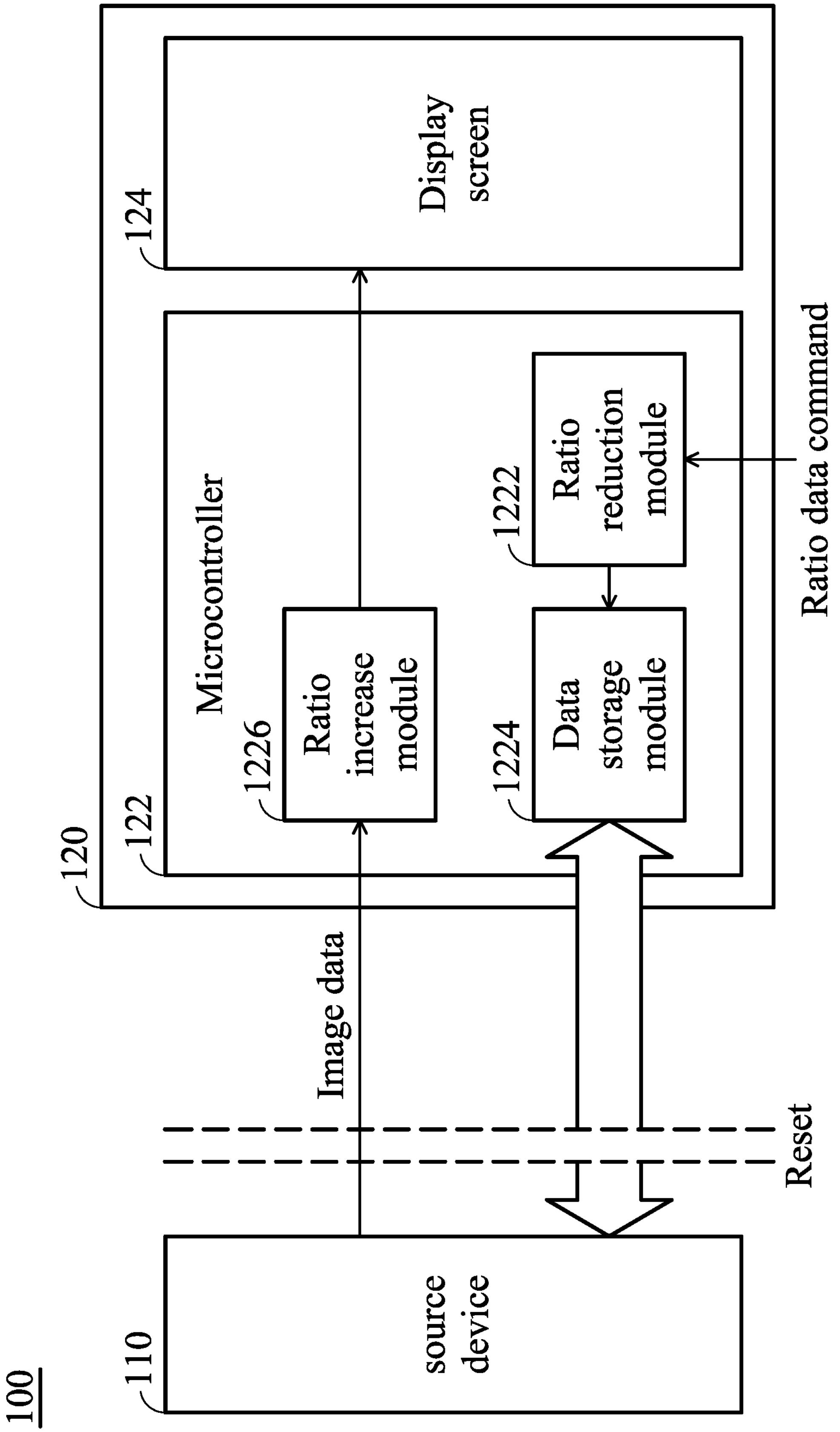
FIG. 1 is a schematic diagram illustrating a system for dynamically adjusting resolution according to an embodiment of the present disclosure.

FIG. 1 is a schematic diagram illustrating a system 100 for dynamically adjusting resolution according to an embodiment of the present disclosure. The system 100 comprises a source device 110 and a display device 120. The source device 110 is used to output image data, and its type ranges from a small host device (e.g., a computer host with a graphics card) to a large host system (e.g., a large server).

The display device 120 may be connected to the source device 110 by a transmission cable that complies with the Video Electronics Standards Association (VESA) regulations, wherein the transmission cable may include one-way and two-way signal transmission channels that comply with the VESA standard. The display device 120 at least comprises a microcontroller 122 and a display screen 124. The microcontroller 122 can receive image data from the source device 110 and transmit the image data to the display screen 124 for display.

The microcontroller 122 may receive a ratio data command input by a user, wherein the ratio data command may comprise a command input directly through the display device 120 or an indirect command input through other devices.

The display device 120 may present an on-screen display (OSD) interface to the user, and the OSD interface may provide multiple selectable ratio data. The user may directly input the ratio data command through the OSD interface to select the desired ratio data.

In addition, the user may also input the ratio data command through the source device 110 or other devices. For example, the microcontroller 122 of the display device 120 may provide a dedicated application programming interface (API) to communicate with the source device 110 or other devices. Therefore, the user may input the ratio data command on the source device 110 or other devices to select the desired ratio data.

In one embodiment, the microprocessor 122 may comprise a ratio reduction module 1222, a data storage module 1224, and a ratio increase module 1226.

The ratio reduction module 1222 may perform a ratio reduction operation on a native resolution of the display screen 124 according to the ratio data command received by the microprocessor 122 to obtain a target resolution.

In one embodiment, the ratio reduction module 1222 is configured outside the microprocessor 122, and the ratio reduction module 1222 is electrically coupled to the microprocessor 122.

The data storage module 1224 replaces the native resolution at a resolution storage address in an extended display identification data (EDID) with the target resolution to allow the source device 110 to read. The EDID is a description of the display capability of the display device and is a standard information format for display devices developed by the VESA Association, just like an ID of the display device. The EDID may contain information such as display device name, serial number, native resolution, etc. The EDID may be used to inform the source device 110 of the capabilities that the display device 120 supports before the display device 120 displays images to ensure that the content is transmitted and displayed normally.

In one embodiment, the data storage module 1224 stores the native resolution into another storage address in the EDID after replacing the native resolution at the resolution storage address with the target resolution. When the source device 110 cannot read the target resolution, the data storage module 1224 may replace the target resolution located in the resolution storage address back to the native resolution.

In another embodiment, when the native resolution is replaced with the target resolution, the microprocessor 122 may set the HPD interrupt and pull the hot plug pin of the display device 120 low for a period of time, so that the graphics card of the source device 110 disconnects the transmission channel between the display device 120 and the source device 110 to stop obtaining the EDID. The microprocessor 122 then pulls the hot plug pin high, so that the graphics card of the source device 110 reset the transmission channel with the display device 120. After the transmission channel is reset, the graphics card of the source device 110 may read and recognize the EDID after the resolution is replaced. After obtaining the target resolution in the EDID, the graphics card of the source device 110 may generate image data according to the number of pixels of the target resolution, thereby realizing the function of dynamically adjusting the resolution of the display device.

The ratio increase module 1226 receives image data from the source device 110, and performs a ratio increase operation on the target resolution according to a value used to indicate the scaling ratio included in the ratio data command, so as to obtain the screen resolution, wherein the image data is generated by the source device 110 according to the target resolution.

The microcontroller 122 sets the native resolution of the display screen 124 to the screen resolution and displays the image data.

It should be noted that although the microcontroller 122 and the display screen 124 are included in the display device 120 in FIG. 1 as an example, the present disclosure should not be limited thereto. In one embodiment, the microcontroller 122 may be a device external to the display device 120 and may be connected to the display device 120 through a high definition multimedia interface (HDMI).

It should be understood that the source device 110 and the display device 120 shown in FIG. 1 are examples of the architecture of the system 100 for dynamically adjusts resolution. Each of the devices shown in FIG. 1 may be implemented through any type of electronic device, such as the electronic device 800 described with reference to FIG. 8, for example.

The detailed operations of how the ratio reduction module 1222 performs a ratio reduction operation and how the ratio increase module 1226 performs a ratio increase operation will be described in detail below.

Figure 2:
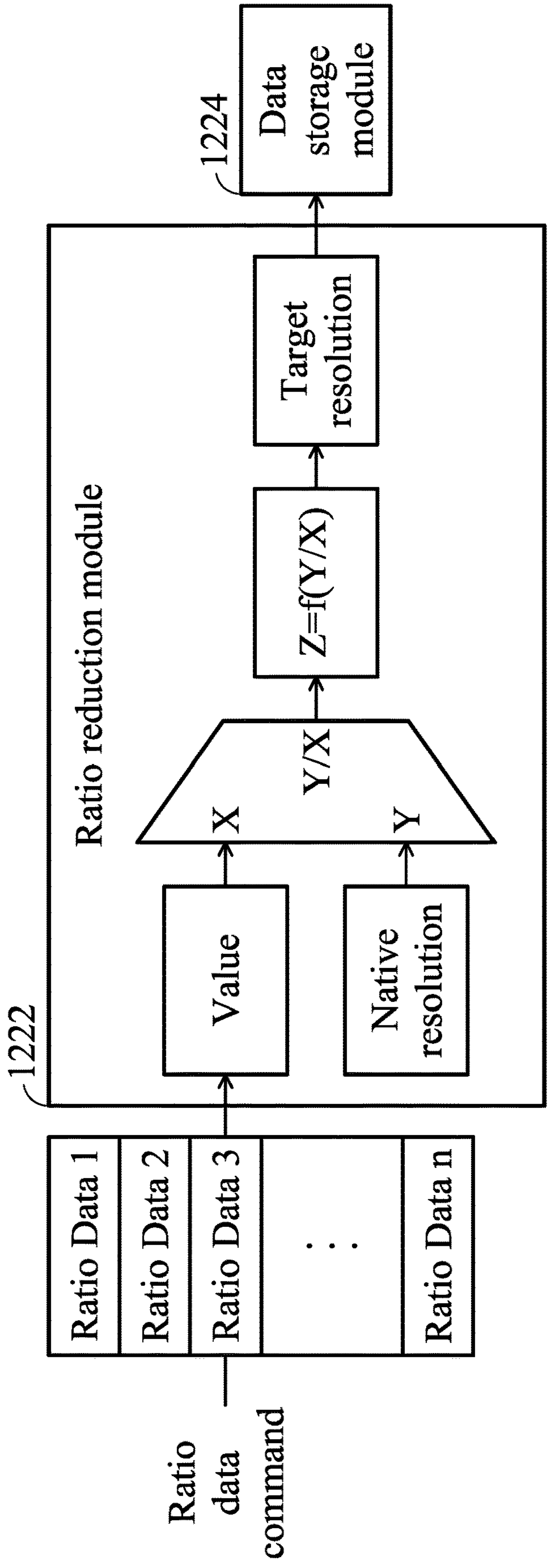
FIG. 2 is a flowchart showing an operation flow chart of the ratio reduction module performing the ratio reduction operation according to an embodiment of the present disclosure.

FIG. 2 is a flowchart showing an operation flow chart of the ratio reduction module 1222 performing the ratio reduction operation according to an embodiment of the present disclosure. As shown in FIG. 2, it is assumed that the display device provides selectable ratio data such as [Ratio Data 1, Ratio Data 2, Ratio Data 3, . . . , Ratio Data n]. The ratio reduction module 1222 may receive the ratio data command 202 and obtain a value, Scaling Ratio, included in the ratio data command 202 and used to indicate the scaling ratio. The value, Scaling Ratio, may be expressed using the following formula.

$$\text{Scaling Ratio} = \{\text{Ratio Data}[n] \mid n = 1, 2, 3 \ldots\}(\text{Ratio Min} \leq \text{Ratio Data}[n] \leq \text{Ratio Max})$$

wherein the value, Scaling Ratio, can be a positive number X, and each ratio data, Ratio Data [n], is within a range between Ratio Min and Ratio Max. In one embodiment, Ratio Min can be set to 1, and Ratio Max can be set to 3. In another embodiment, each ratio data, Ratio Data [n], is not limited to integers or decimals.

The microprocessor may obtain the native resolution Y of the display screen, wherein the native resolution is equal to the physical resolution of the display screen, and is divided into horizontal pixel $Y_H$ and vertical pixel $Y_V$.

The ratio reduction module 1222 divides the native resolution Y by the value X and performs a round-down operation to generate a first resolution Z, wherein the first resolution Z is composed of horizontal pixel $Z_H$ and vertical pixel $Z_V$, and can be expressed using the following formula:

$$Z_H = Rounddown(Y_H / X)$$

$$Z_V = Rounddown(Y_V / X)$$

When the first resolution is not greater than the native resolution, the ratio reduction module 1222 sets the first resolution as the target resolution. When the first resolution is greater than the original resolution, the ratio reduction module 1222 sets the native resolution as the target resolution.

The ratio reduction module 1222 may transmit the target resolution to the data storage module 1224 after setting the target resolution. The source device may subsequently re-identify and confirm the target resolution with the display device to generate and transmit image data.

Figure 3:
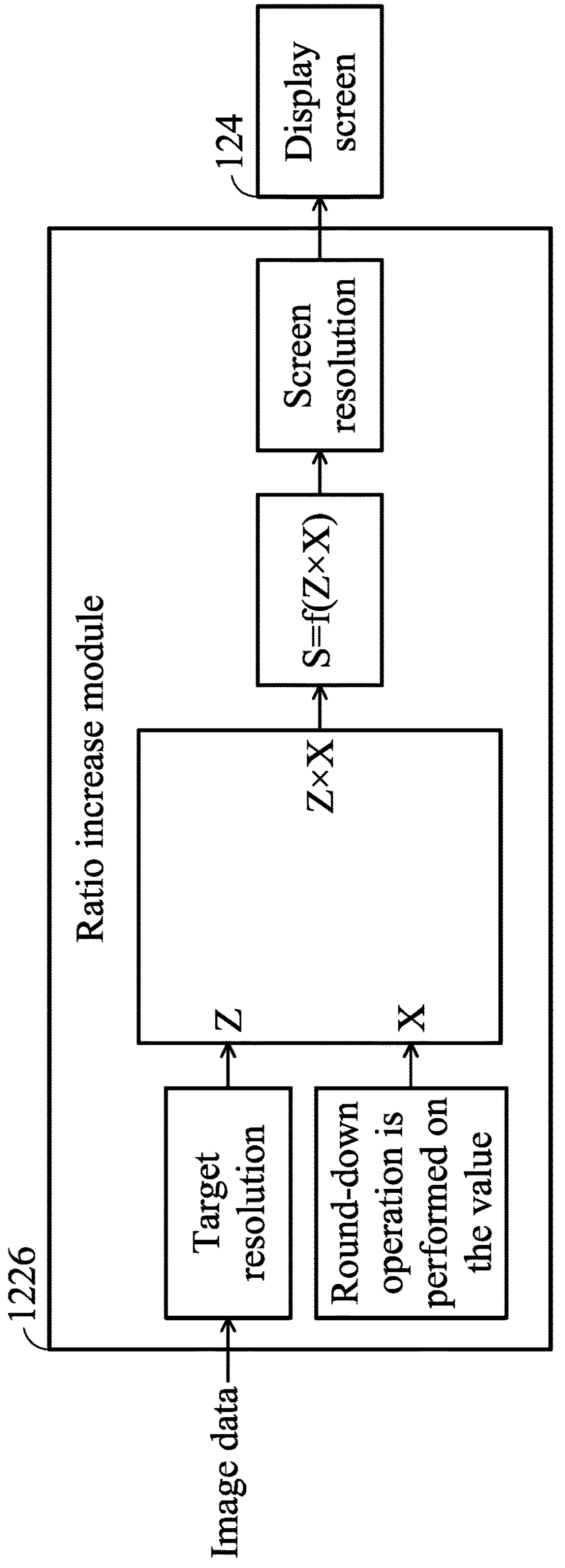
FIG. 3 is an operation flow chart showing the ratio increase module performing the ratio increase operation according to an embodiment of the present disclosure.

FIG. 3 is an operation flow chart showing the ratio increase module 1226 performing the ratio increase operation according to an embodiment of the present disclosure.

As shown in the FIG. 3, the ratio increase module 1226 may obtain the target resolution Z from the ratio reduction module 1222 or the data storage module 1224. The target resolution Z can be expressed using the following formula:

$$Z=\{Z_H,Z_V\}$$

wherein $Z_H$ represents the horizontal pixel and $Z_V$ represents the vertical pixel. Compared with the image data with native resolution, the number of pixels in the image data at the target resolution is significantly reduced. Since the physical resolution of the display screen is fixed, the number of pixels needs to be mapped and enlarged according to a certain ratio when the resolution of the image data needs to be presented according to the size of the display screen. In the present disclosure, the target resolution is enlarged by an integer multiple equal to a first value X, wherein the first value is obtained by performing a round-down operation on a value included in the ratio data command 202 of FIG. 2 and used to indicate the scaling ratio. When the first value is larger, the number of pixels mapped to the image data is larger and the displayed text and images are larger, thereby improving the viewing comfort of the viewing angle. The first value X can be expressed using the following formula:

$$X=\text{Rounddown[Scaling Ratio]}$$

The screen resolution S is generated by multiplying the target resolution Z by the first value X. The number of pixels presented on the display screen includes a horizontal pixel $S_H$ and a vertical pixel $S_V$. The screen resolution S, the horizontal pixel $S_H$ and the vertical pixel $S_V$ can be expressed using the following formula:

$$S=\{S_H,S_V\}$$

$$S_H=Z_H*X$$

$$S_V=Z_V*X$$

Figure 4:
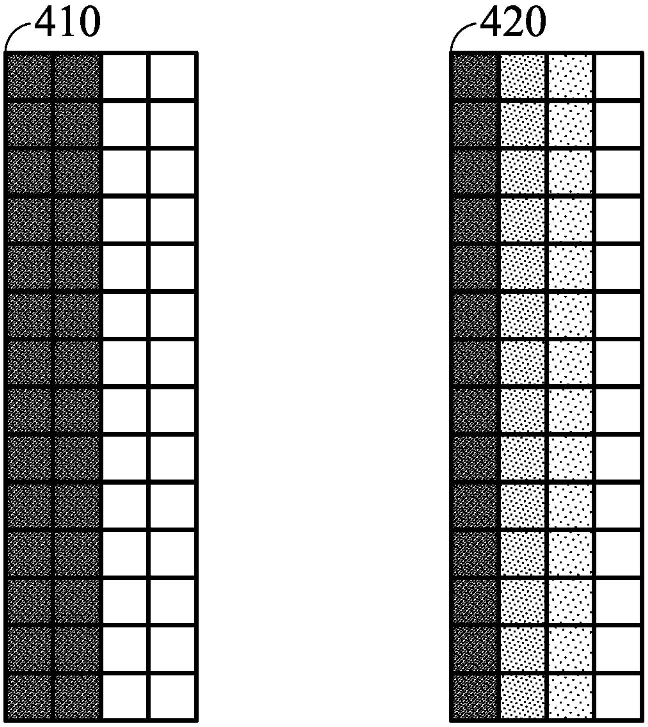
FIG. 4 is a schematic diagram showing an edge area of a display screen according to an embodiment of the present disclosure.

As shown above, that the screen resolution is enlarged by multiplying the target resolution by the first value that is an integer multiple. The advantage of using integer multiples is that the edges of the displayed image data are enlarged in an integer multiple ratio, which may not produce excessive grayscales that cause the image edges to blur, and may maintain a certain clarity of the image data. As shown in FIG. 4, 410 is the edge area of the screen resolution obtained by multiplying the target resolution by the first value that is an integer multiple. 420 shows the edge area with excessive grayscale, wherein the excessive grayscale is a manifestation of low contrast and may reduce the clarity of the displayed image data.

The mapping and enlarging relationship between the target resolution and the screen resolution is shown in TABLE 1.

TABLE 1

| Target resolution (the unit is a pixel) | Magnification | Screen resolution (the unit is a pixel) | Magnification (the unit is a pixel) |
|---|---|---|---|
| □ | 1:1 | □ | No change |
| □ | 1:2 | □□<br>□□ | Double magnification |
| □ | 1:3 | □□□<br>□□□<br>□□□ | Triple magnification |

In one embodiment, when the screen resolution is equal to the native resolution, all pixels of the display screen are filled and displayed. When the screen resolution is lower than the native resolution, the microprocessor may send a display command to the display screen, wherein the display command is used to instruct the display screen to display the image data at the screen resolution in the center of the display screen, and turn off the driving power corresponding to the edge area exceeding the screen resolution or display colors with low power consumption in the edge area.

Figure 5:
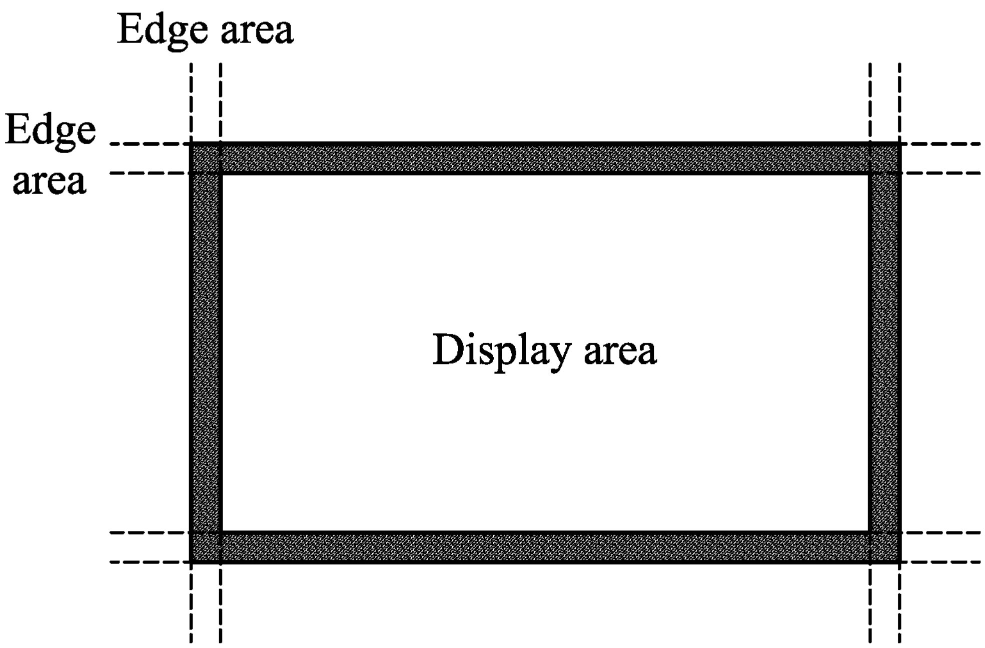
FIG. 5 is a schematic diagram of turning off the driving power corresponding to the edge area or displaying colors with low power consumption in the edge area according to an embodiment of the present disclosure.

FIG. 5 is a schematic diagram of turning off the driving power corresponding to the edge area or displaying colors with low power consumption in the edge area according to an embodiment of the present disclosure. As shown in FIG. 5, the image data is displayed in the display area in the center of the display screen, and the driving power of the edge area exceeding the screen resolution are turned off or colors with low power consumption are displayed in the edge area. The advantage of turning off the driving power of the edge area or displaying colors with low power consumption in the edge area is that on the one hand, it ensures that the display area has an integral multiple of the target resolution, and on the other hand, there is no need to consume power to drive the edge area where the image data is not displayed, thus reducing the power consumption of the display device. In addition, since the image data transmitted by the source device is generated according to the target resolution, the transmission bandwidth and power consumption between the source device and the display device can be reduced.

Figure 6:
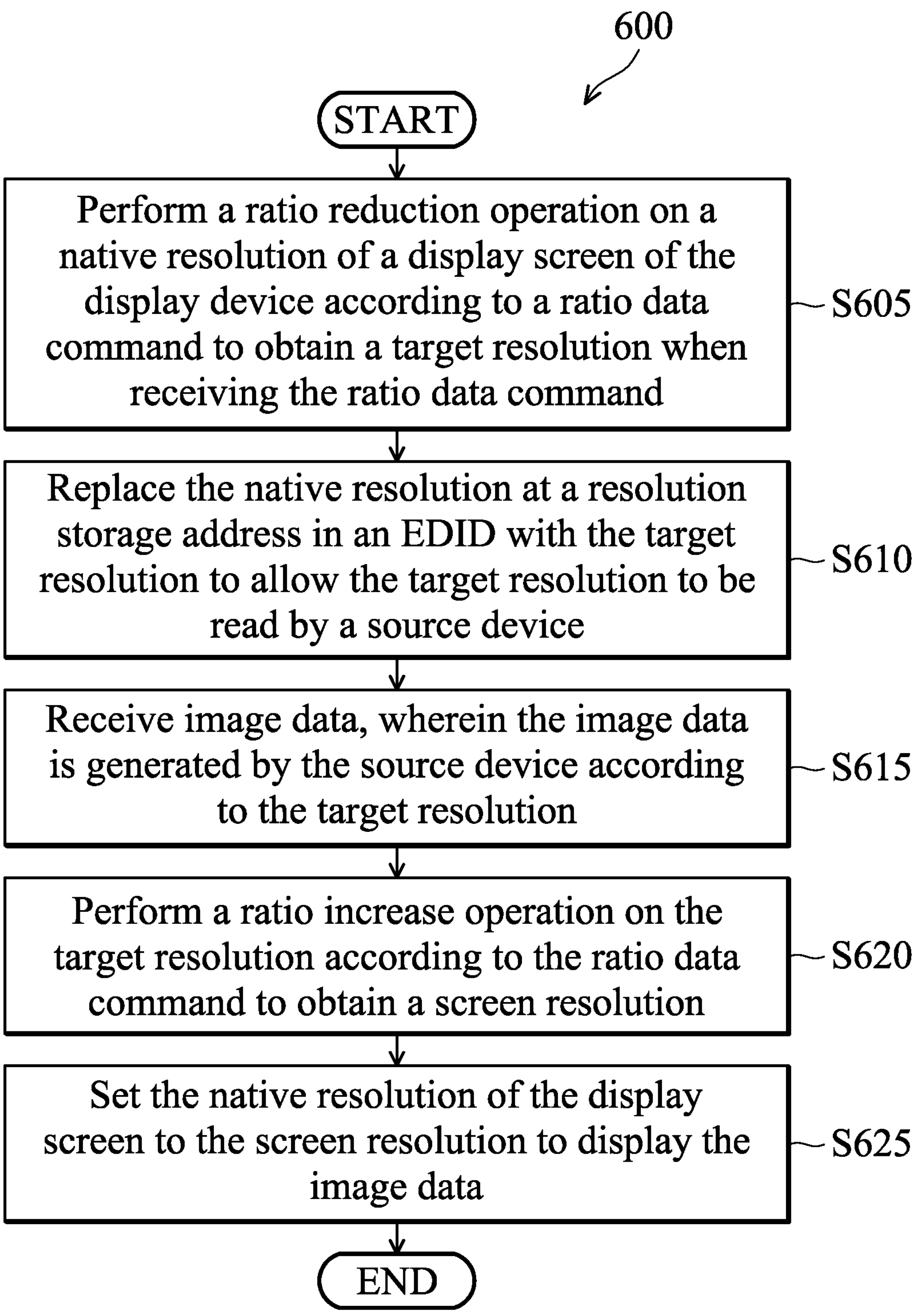
FIG. 6 is a flowchart showing a method for dynamically adjusting resolution according to an embodiment of the present disclosure.

FIG. 6 is a flowchart showing a method 600 for dynamically adjusting resolution according to an embodiment of the present disclosure. The method 600 is executed by the display device 120 as shown in FIG. 1.

In step S605, a microcontroller of the display device performs a ratio reduction operation on a native resolution of a display screen of the display device according to a ratio data command to obtain a target resolution when receiving the ratio data command. In one embodiment, the ratio data command includes a value used to indicate a scaling ratio, and the value is a positive number. The ratio reduction operation further comprises the following steps. The microcontroller divides the native resolution by the value and performing a round-down operation to generate a first resolution. When the first resolution is not greater than the native resolution, the microcontroller sets the first resolution to the target resolution. When the first resolution is greater than the original resolution, the microcontroller sets the native resolution to the target resolution.

Next, in step S610, the microcontroller replaces the native resolution at a resolution storage address in an extended display identification data (EDID) with the target resolution to allow the target resolution to be read by a source device.

In step S615, the microcontroller receives image data, wherein the image data is generated by the source device according to the target resolution, and the image data has the target resolution.

In step S620, the microcontroller performs a ratio increase operation on the target resolution according to the ratio data command to obtain a screen resolution. In one embodiment, the ratio increase operation further comprises the following steps. The microprocessor performs a round-down operation on the value to generate a first value. The microprocessor multiplies the target resolution by the first value to generate the screen resolution.

In step S625, the microcontroller sets the native resolution of the display screen to the screen resolution to display the image data.

In one embodiment, when the screen resolution is lower than the native resolution, the microprocessor sends a display command to the display screen, wherein the display command is used to instruct the display screen to display the image data in the center of the display screen and turn off the driving power corresponding to the edge area exceeding the screen resolution or to display colors with low power consumption in the edge area.

Figure 7:
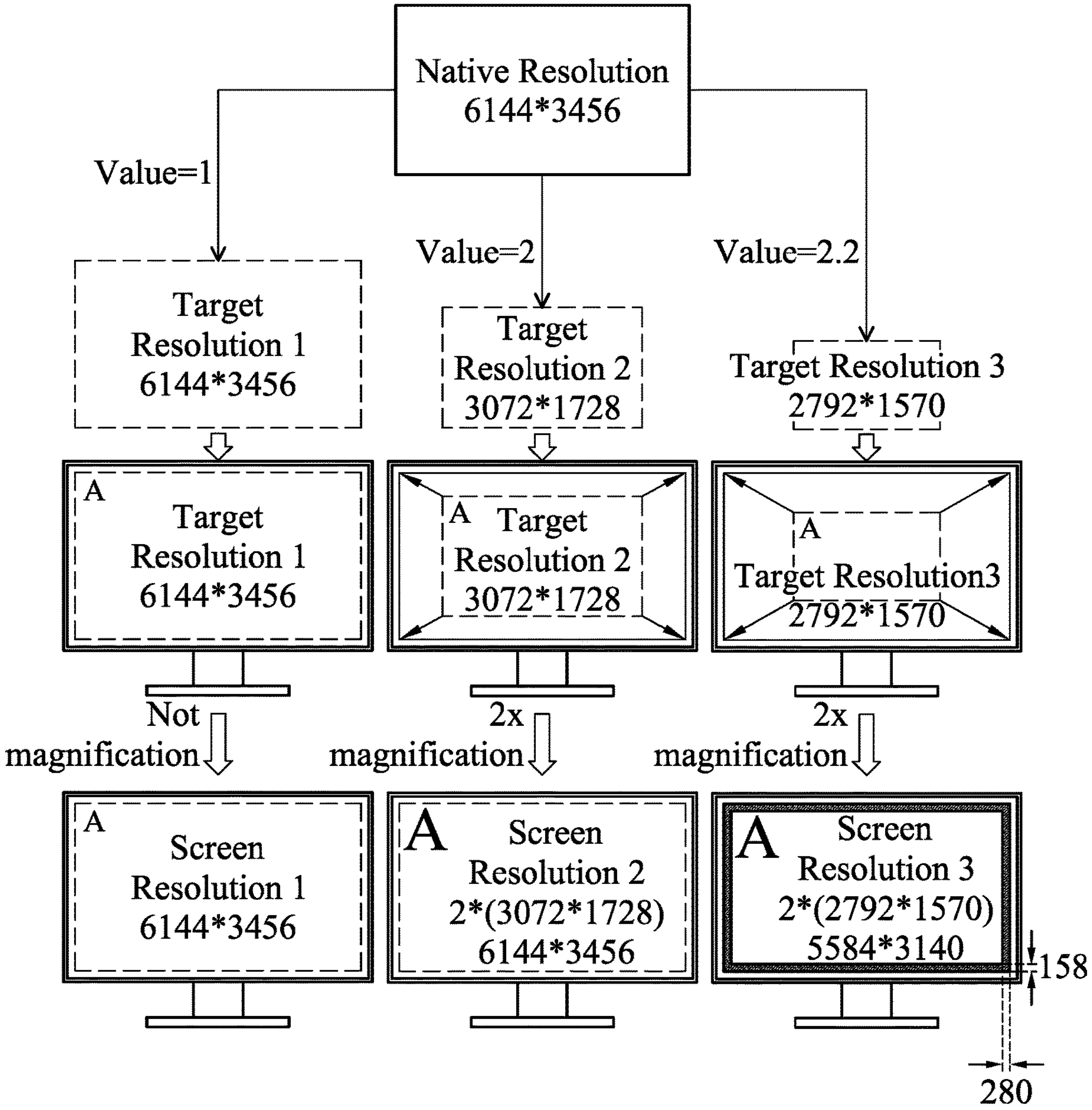
FIG. 7 is a schematic diagram showing resolution scaling according to an embodiment of the present disclosure.

FIG. 7 is a schematic diagram showing resolution scaling according to an embodiment of the present disclosure. In FIG. 7, the native resolution of a display screen is 6K (6144*3456) and the values used to indicate the scaling ratio in the ratio data command are 1, 2, and 2.2 as an example for illustration.

As shown in the FIG. 7, when the value indicating the scaling ratio are 1, 2, and 2.2, the target resolution 1, the target resolution 2, and the target resolution 3 can be expressed using the following formula:

$$\text{Target resolution 1} = [6144*3456]/1 = [6144*3456]$$

$$\text{Target resolution 2} = [6144*3456]/2 = [3072*1728]$$

$$\text{Target resolution 3} = [6144*3456]/2.2 = [\{2792.7272\ \ldots\}*\{1570.909090\ \ldots\}]$$

For the target resolution 3, since the target resolution 3 is not reduced by an integer multiple, the microcontroller performs a round-down operation on the target resolution 3, as expressed using the following formula:

Rounddown(Target resolution 3)=[2792*1570]

After obtaining the target resolution 1, the target resolution 2 and the target resolution 3, the microprocessor then enlarges the target resolutions 1, 2 and 3 according to an integer ratio to obtain the screen resolution 1, the screen resolution 2 and screen resolution 3, as expressed using the following formula:

$$\text{Screen resolution 1} = \text{Target resolution 1}*\text{Value 1} = [6144*3456]*1 = 6144*3456$$

-continued $$\text{Screen resolution 2} = \text{Target resolution 2}*\text{Value 2} = [3072*1728]*1 = 6144*3456$$

Since the value 3 is 2.2, the microprocessor performs a round-down operation on the value 3, as expressed using the following formula:

Rounddown(Value 3)=2

Therefore, the screen resolution 3 is expressed as follows:

$$\text{Screen resolution 3} = \text{Target resolution 3}*\mathit{Rouunddown}(\text{Value 3}) = [7892*1570]*2 = 5584*3140$$

As shown in FIG. 7, when the display screen displays the image data at the screen resolution 3, since the display screen only displays the image data with the pixel size of 5584*3140 in the screen resolution 3, an edge area with a size of 6144*316+3140*560 pixels appears on the display screen. The relationship between the target resolution, the screen resolution, the native resolution and the edge area in FIG. 7 are shown in TABLE 2.

TABLE 2

| Target resolution | Value after round-down | Screen resolution | Native resolution | Edge area |
|---|---|---|---|---|
| 6144*3456 | 1 | 6144*3456 | 6144*3456 | 0 |
| 3072*1728 | 2 | 6144*3456 | | 0 |
| 2792*1570 | 2 | 5584*3140 | | 6144*316 |

As mentioned above, the method and device for dynamically adjusting resolution proposed by the present disclosure use a lower target resolution than the native resolution to generate image data, so as to reduce the amount of image data that has to be generated, as well as the computing power and power consumption of the graphics card of the source device. It also significantly reduces the amount of image data that needs to be transmitted from the source device. This aids in reducing the power consumption of the entire transmission channel. In addition, in the display device, directly replacing the native resolution in the EDID with the target resolution is more flexible for resolution switching and selection and can reduce the storage capacity of excessive EDID and reduce the cost of storage hardware.

It should be noted that the embodiment of the microprocessor 122 in FIG. 1 can be implemented in hardware, software, firmware, or any combination thereof. For example, all modules in microprocessor 122 may each be implemented as computer program code executed by one or more processors. Alternatively, all modules in microprocessor 122 may be implemented individually as hardware logic/circuitry.

Figure 8:
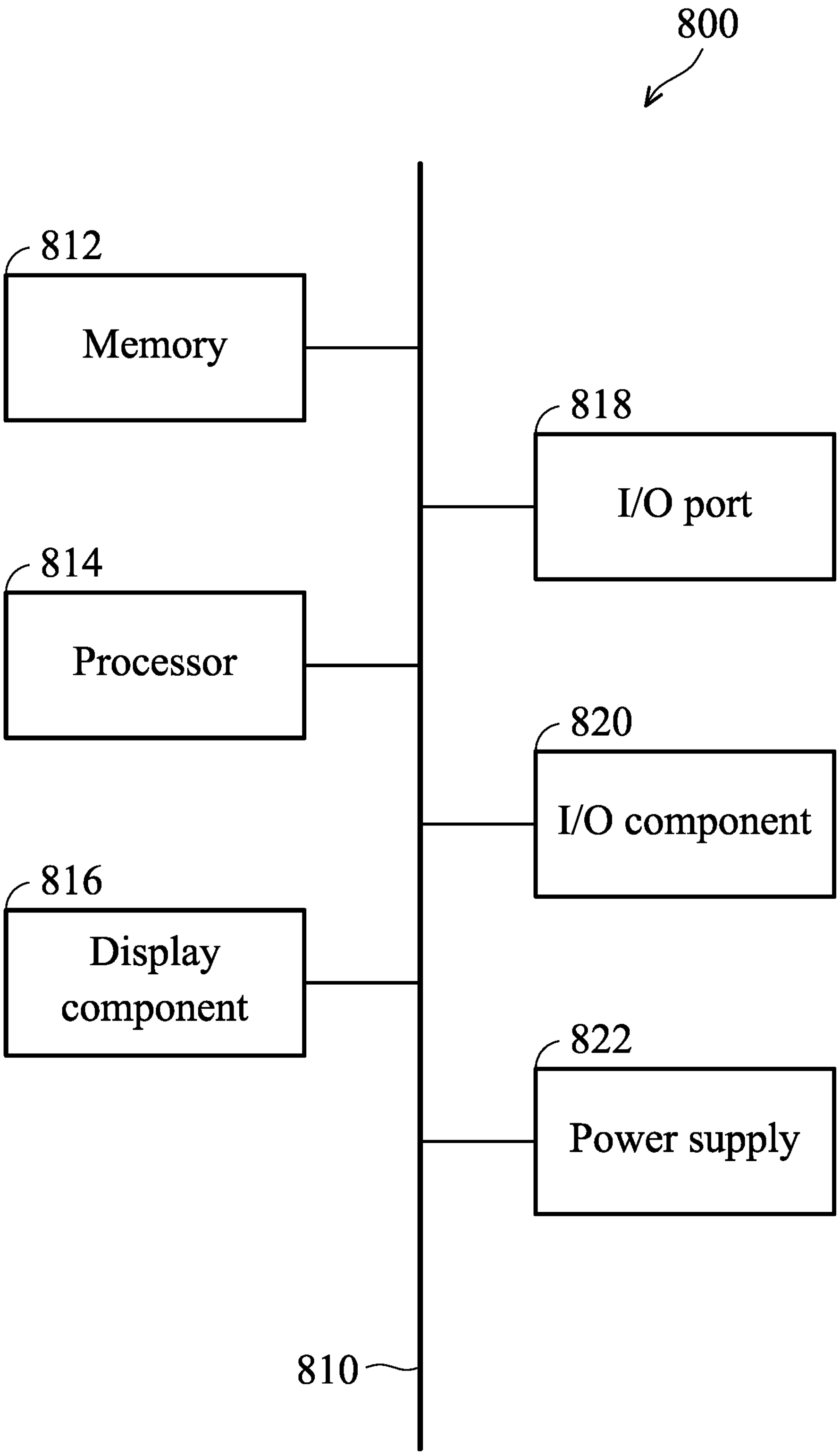
FIG. 8 illustrates exemplary operating environment for implementing embodiments of the present disclosure.

The embodiments described herein, including systems, methods/processes, and/or apparatuses, may be implemented using well known servers/computers, such as an electronic device 800 shown in FIG. 8. For example, the display device 120 and the microcontroller 120 can be implemented using one or more electronic device 800. The electronic device 800 is described as follows, for purposes of illustration.

Referring to FIG. 8, an exemplary operating environment for implementing embodiments of the present disclosure is shown and generally known as an electronic device 800. The electronic device 800 is merely an example of a suitable computing environment and is not intended to limit the scope of use or functionality of the disclosure. Neither should the electronic device 800 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 8, the electronic device 800 may include a bus 810 that is directly or indirectly coupled to the following devices: one or more memories 812, one or more processors 814, one or more display components 816, one or more input/output (I/O) ports 818, one or more input/output components 820, and an illustrative power supply 822. The bus 810 may represent one or more kinds of busses (such as an address bus, data bus, or any combination thereof). Although the various blocks of FIG. 8 are shown with lines for the sake of clarity, and in reality, the boundaries of the various components are not specific. For example, the display component such as a display device may be considered an I/O component and the processor may include a memory.

The electronic device 800 typically includes a variety of computer-readable media. The computer-readable media can be any available media that can be accessed by electronic device 800 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the electronic device 800. The computer storage media may not comprise signals per se.

The communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 812 may include computer-storage media in the form of volatile and/or nonvolatile memory. The memory may be removable, non-removable, or a combination thereof. Exemplary hardware devices include solid-state memory, hard drives, optical-disc drives, etc. The electronic device 800 includes one or more processors that read data from various entities such as the memory 812 or the I/O components 820. The display component(s) 816 present data indications to a user or to another device. Exemplary presentation components include a display screen, etc.

The I/O ports 818 allow the electronic device 800 to be logically coupled to other devices including the I/O components 820, some of which may be embedded. Illustrative components include a microphone, joystick, wireless device, etc. The I/O components 820 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the electronic device 800, or any combination thereof. The electronic device 800 may be equipped with depth cameras, such as stereoscopic camera systems, infrared camera systems, RGB camera systems, or any combination thereof, to realize gesture detection and recognition. Furthermore, the electronic device 800 may be equipped with accelerometers or gyroscopes that enable detection of motion. The output of the accelerometers or gyroscopes may be provided to the display of the electronic device 800 to carry out immersive augmented reality or virtual reality.

Furthermore, the processor 814 in the electronic device 800 can execute the program code in the memory 812 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamically adjusting resolution, wherein the method is implemented by a display device and comprises:
 performing, by a microcontroller of the display device, a ratio reduction operation on a native resolution of a display screen of the display device according to a ratio data command to obtain a target resolution when receiving the ratio data command;
 replacing, by the microcontroller, the native resolution at a resolution storage address in an extended display identification data (EDID) with the target resolution to allow the target resolution to be read by a source device;
 receiving, by the microcontroller, image data, wherein the image data is generated by the source device according to the target resolution;
 performing, by the microcontroller, a ratio increase operation on the target resolution according to the ratio data command to obtain a screen resolution; and
 setting, by the microcontroller, the native resolution of the display screen to the screen resolution to display the image data;
 wherein the method further comprises:
 storing the native resolution in another storage location in the EDID; and
 replacing the target resolution in the resolution storage address with the native resolution when the source device cannot read the target resolution.

2. The method for dynamically adjusting resolution as claimed in claim 1, wherein the ratio data command includes a value used to indicate a scaling ratio and the ratio reduction operation further comprises:
 dividing the native resolution by the value and performing a round-down operation to generate a first resolution;
 setting the first resolution to the target resolution when the first resolution is not greater than the native resolution; and
 setting the native resolution to the target resolution when the first resolution is greater than the native resolution.

3. The method for dynamically adjusting resolution as claimed in claim 2, wherein the value is a positive number.

4. The method for dynamically adjusting resolution as claimed in claim 1, wherein the ratio data command comprises a value used to indicate the scaling ratio, and the ratio increase operation further comprises:
 performing a round-down operation on the value to generate a first value; and
 multiplying the target resolution by the first value to generate the screen resolution.

5. The method for dynamically adjusting resolution as claimed in claim 4, wherein a display command is sent to the display screen when the screen resolution is lower than the native resolution, wherein the display command is used to instruct the display screen to display the image data in the center of the display screen and turn off driving power corresponding to edge area exceeding the screen resolution or display colors with low power consumption in the edge area.

6. The method for dynamically adjusting resolution as claimed in claim 1, wherein the image data has the target resolution.

7. The method for dynamically adjusting resolution as claimed in claim 1, wherein after the native resolution is replaced with the target resolution, transmission channels between the source device and the display device are reset by the microcontroller.

8. A device for dynamically adjusting resolution, comprising:
 one or more processors; and
 one or more computer storage media for storing one or more computer-readable instructions, wherein the processor is configured to drive the computer storage media to execute the following tasks:
 performing a ratio reduction operation on a native resolution of a display screen according to a ratio data command to obtain a target resolution when receiving the ratio data command;
 replacing the native resolution at a resolution storage address in an extended display identification data (EDID) with the target resolution to allow the target resolution to be read by a source device;
 receiving image data, wherein the image data is generated by the source device according to the target resolution;
 performing a ratio increase operation on the target resolution according to the ratio data command to obtain a screen resolution; and
 setting the native resolution of the display screen to the screen resolution to display the image data;
 wherein the processor further executes the following tasks:
 storing the native resolution in another storage location in the EDID; and
 replacing the target resolution in the resolution storage address with the native resolution when the source device cannot read the target resolution.

9. The device for dynamically adjusting resolution as claimed in claim 8, wherein the ratio data command includes a value used to indicate a scaling ratio and the ratio reduction operation further comprises:
 dividing the native resolution by the value and performing a round-down operation to generate a first resolution;
 setting the first resolution to the target resolution when the first resolution is not greater than the native resolution; and
 setting the native resolution to the target resolution when the first resolution is greater than the native resolution.

10. The device for dynamically adjusting resolution as claimed in claim 9, wherein the value is a positive number.

11. The device for dynamically adjusting resolution as claimed in claim 8, wherein the ratio data command comprises a value used to indicate the scaling ratio, and the ratio increase operation further comprises:
 performing a round-down operation on the value to generate a first value; and
 multiplying the target resolution by the first value to generate the screen resolution.

12. The device for dynamically adjusting resolution as claimed in claim 11, wherein the processor sends a display command to the display screen when the screen resolution is lower than the native resolution, wherein the display command is used to instruct the display screen to display the image data in the center of the display screen and turn off driving power corresponding to edge area exceeding the screen resolution or display colors with low power consumption in the edge area.

13. The device for dynamically adjusting resolution as claimed in claim 8, wherein the image data has the target resolution.

14. The device for dynamically adjusting resolution as claimed in claim 8, wherein after the native resolution is replaced with the target resolution, the processor resets transmission channels between the source device and the display device.

* * * * *